Oct. 17, 1961     J. L. LÖKKA     3,004,774
INTERCONNECTION BETWEEN TRAILER AND HAULING VEHICLE
Filed May 20, 1960
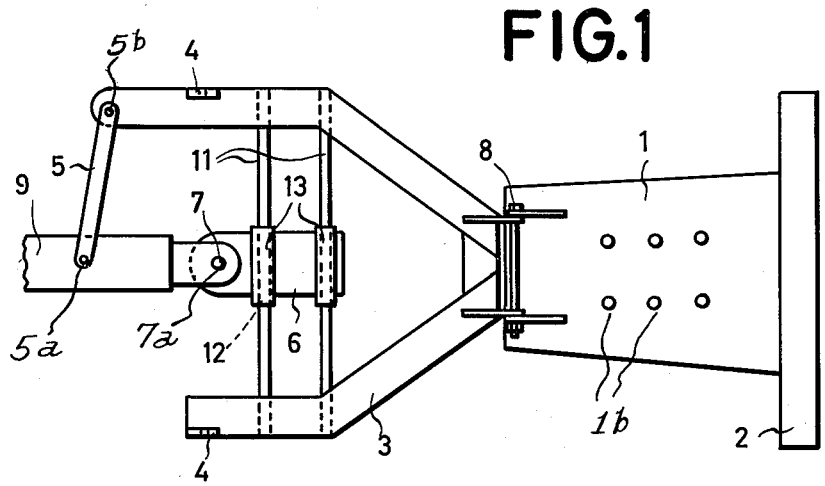
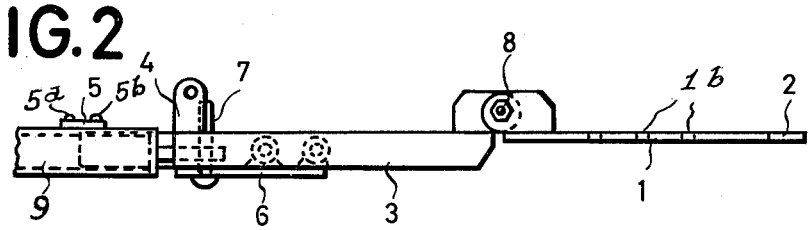
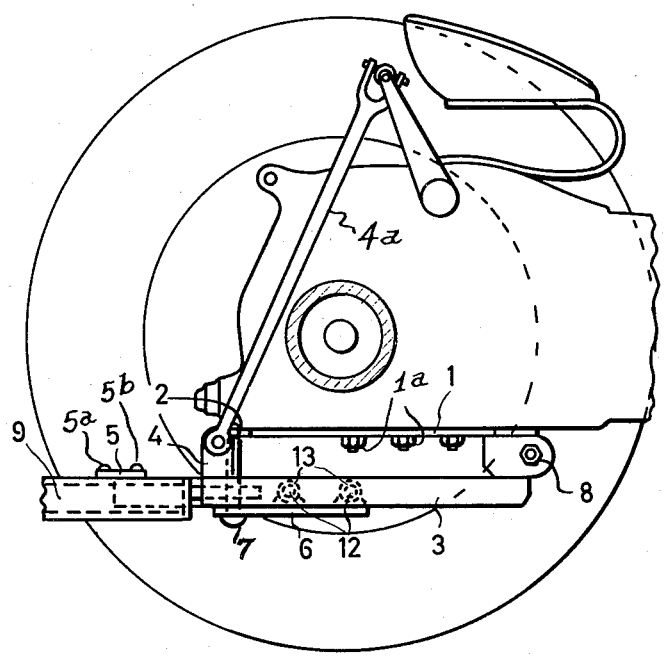
INVENTOR
Jens Leif Lökka,
BY Pierce, Scheffler & Parker
his ATTORNEYS

United States Patent Office 3,004,774
Patented Oct. 17, 1961

3,004,774
INTERCONNECTION BETWEEN TRAILER AND HAULING VEHICLE
Jens Leif Lökka, Haerland P.O., Mysen, Norway
Filed May 20, 1960, Ser. No. 30,564
Claims priority, application Norway June 4, 1959
2 Claims. (Cl. 280—447)

The present invention relates to an interconnection between a trailer and a hauling vehicle therefor, especially for use in connection with a hauling vehicle having a raisable and lowerable hauling frame.

The object of the invention is to provide an interconnection or coupling of the nature indicated above, where the hauling bolt is movable in such a manner that the trailer follows the track of the vehicle.

According to the invention this is obtained by a coupling ("hitch") wherein the hauling rod of the trailer is pivotable about a vertical bolt mounted upon a transversely movable member upon the traction frame of the vehicle, and wherein the hauling rod, positioned somewhat to the rear of the coupling bolt, is provided with a transverse guide stay, pivotable about a vertical stud, the other end of which stay is pivotably connected to the traction frame.

By this arrangement the bolt will, upon swinging of the traction vehicle, be moved transversely of the drive direction, so that the guiding stay acts upon the trailer's hauling rod in such a manner that said hauling rod is guided to follow the track of the traction vehicle. In this manner curves of much shorter radii of curvature may be described and under no circumstances will the hauling rod contact the rear wheels of the traction vehicle. At the same time the displaceable traction bolt brings it about that at all times an equal load is impressed upon both of the rear wheels of the traction vehicle, which, especially in the case of a tractor, will tend to counteract capsizing and rearing.

According to a further feature of the invention the traction frame is connected, by means of a hinge, with a plate attached to the traction vehicle, which plate at the top side of the hinge is provided with a locking member which, when the traction frame is raised, abuts against the traction bolt and prevents disengagement of the traction rod from the bolt.

An embodiment of the invention will by way of example be explained more fully with reference to the annexed drawing.

FIG. 1 is a plan view of a coupling in accordance with the invention, where the attachment plate is swung out.

FIG. 2 shows a side view of FIG. 1.

FIG. 3 is a side view of the coupling, where the attachment plate is shown as having been swung down over the frame so that the bolt is secured, and where the coupling is shown as attached to the frame of a traction vehicle, said traction vehicle being provided with an hydraulic raising and lowering device.

The attachment plate 1 is adapted to become attached to the traction vehicle by means of bolts 1a fitted into the holes 1b shown in FIG. 1. At one end thereof the plate 1 is by means of a hinge 8 attached to the traction frame 3, which has two lugs 4 for attachment of a hydraulic raising and lowering device 4a which is a part of the traction vehicle per se. The traction frame is provided with two transverse slide rods 11, upon which a slide member 6 is displaceable by means of slide sleeves 13. The slide member 6 carries a vertically disposed traction bolt 7 accommodated in a suitable aperture 7a in, and adjacent an end of, the hauling rod 9 of the trailer. Somewhat to the rear of the bolt 7 the hauling rod is provided with a transverse stay 5, swingable about a vertical stud 5a and pivotably attached at its other end to the frame 3 at pivot member 5b. That end of the attachment plate 1, which is opposite to the hinge 8, is provided with a locking plate 2, and when the frame 3 is raised by means of the hydraulic device 4a, the locking plate 2 extends over the bolt 7, during lateral movement of the latter, to hinder disengagement of the hauling rod 9 from the bolt 7 (see FIG. 3).

In use, as the traction vehicle turns to one side or the other, e.g., to the right, for instance, the posterior ends of traction frame 3 are swung outwardly in the opposite direction, e.g., to the left, and by means of transverse stay 5 pull hauling rod 9 to the left so as to guide the trailer into the same turning path as that being followed by the traction vehicle. As the turn concludes the traction vehicle resumes its original direction (i.e., is turned away from the right and back to the straight-ahead direction) and the posterior of traction frame 3 pushes hauling rod 9 towards the right by an amount to return traction vehicle to a straight-ahead direction.

I claim:
1. Interconnection between a trailer and a hauling vehicle, comprising a traction frame, means for securing said traction frame to said hauling vehicle, a laterally movable slide member on the traction frame, a vertical bolt on said slide member, a hauling rod one end of which is secured to said trailer, said hauling rod having, at its other end an aperture in which said vertical bolt is pivotally arranged, a transverse stay pivotally connected at one end to said traction frame and pivotally connected at its other end to said hauling rod, the last mentioned pivotal connection being to the rear of said vertical bolt.

2. Interconnection between a trailer and a hauling vehicle, as defined in claim 1, wherein the hauling vehicle includes means for raising and lowering said traction frame, characterized in that said traction frame is hingedly connected to a plate attached to said hauling vehicle and in that said plate is provided with a locking member which, when the traction frame is raised, abuts against the vertical bolt and hinders disengagement of the hauling rod from said bolt.

References Cited in the file of this patent
UNITED STATES PATENTS

| | | |
|---|---|---|
| 1,797,897 | Campbell et al. | Mar. 24, 1931 |
| 2,788,226 | Malone | Apr. 9, 1957 |
| 2,880,016 | Peterson | Mar. 31, 1959 |